(12) United States Patent
Choi et al.

(10) Patent No.: US 7,983,647 B2
(45) Date of Patent: Jul. 19, 2011

(54) METHOD AND APPARATUS FOR DETERMINING SCALING FACTOR IN A COMMUNICATION SYSTEM

(75) Inventors: Ji-Hoon Choi, Suwon-si (KR); Sung-Kwon Jo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 729 days.

(21) Appl. No.: 12/012,383

(22) Filed: Jan. 31, 2008

(65) Prior Publication Data

US 2008/0182542 A1 Jul. 31, 2008

(30) Foreign Application Priority Data

Jan. 31, 2007 (KR) .......... 10-2007-0009993

(51) Int. Cl.
*H04B 1/10* (2006.01)

(52) U.S. Cl. .......... 455/296; 455/334; 375/340

(58) Field of Classification Search .......... 455/296, 455/313, 323, 334; 375/340
See application file for complete search history.

(56) References Cited

U.S. PATENT DOCUMENTS

| 6,928,104 | B2 | 8/2005 | Pan et al. | |
| 7,269,205 | B2 * | 9/2007 | Wang | 375/148 |
| 7,313,172 | B2 | 12/2007 | Pan et al. | |
| 2006/0013289 | A1 | 1/2006 | Hwang | |

FOREIGN PATENT DOCUMENTS

| KR | 10-2004-0007249 | 1/2004 |
| KR | 10-2005-0021510 | 3/2005 |
| KR | 10-2005-0098026 | 10/2005 |
| KR | 10-0633054 | 9/2006 |

* cited by examiner

*Primary Examiner* — Nhan Le

(57) ABSTRACT

A method for determining a scaling factor in a communication system. The method includes calculating an average power for each of an input signal and an output signal of a channel predictor; calculating a noise variance using the calculated average power; normalizing the noise variance with an average power of the channel predictor's output signal; and determining a scaling factor using the normalized noise variance.

20 Claims, 6 Drawing Sheets

METHOD AND APPARATUS FOR DETERMINING SCALING FACTOR IN A COMMUNICATION SYSTEM

CROSS-REFERENCE TO RELATED APPLICATION(S) AND CLAIM OF PRIORITY

The present application claims the benefit under 35 U.S.C. §119(a) of a Korean Patent Application filed in the Korean Intellectual Property Office on Jan. 31, 2007 and assigned Serial No. 2007-9993, the disclosure of which is incorporated herein by reference.

TECHNICAL FIELD OF THE INVENTION

The present invention relates generally to a communication system, and in particular, to a method for determining a scaling factor for pilot interference cancellation, and an apparatus thereof.

BACKGROUND OF THE INVENTION

Generally, in the communication system, an increase in the number of mobile stations increases the interference caused by multiple access, causing a reduction in the channel capacity. To prevent the reduction in the channel capacity, a receiver (or receiving terminal) uses an interference canceler. The interference canceler can be classified into a Parallel Interference Canceler (PIC) and a Successive Interference Canceler (SIC). The interference cancelers repeatedly perform data detection and interference cancellation to cancel pilot signals and data signals of other mobile stations, which serve as interference signals to the receiver. Implementation of the receiver for performing such operations is very difficult. In order to solve such problems, a pilot interference canceler has been proposed, which cancels only the pilot cancelable without the detection process, from the signal received at the receiver.

Because the pilot signal cannot be used for data transmission and reception, it acts as overhead in terms of the system capacity. As an example of the overhead, when the number of mobile stations connected to a base station increases, only some mobile stations transmit data, and the remaining mobile stations may transmit only the pilot signal and control signal necessary for link maintenance, without transmitting the data. In this case, therefore, an increase in the system capacity can be expected by applying the pilot interference canceler to the communication system.

FIG. 1 illustrates a structure of a receiver with a conventional pilot interference canceler.

Referring to FIG. 1, if the receiver disables the pilot interference canceler, a signal received via an antenna is input to a modem receiver (or CDMA modem receiver) 114 after passing through a Radio Frequency (RF) front-end unit 102. The modem receiver 114 performs modem processing on the input signal.

However, when the receiver uses the pilot interference canceler, the signal output from the RF front-end unit 102 is input not only to the modem receiver 114, but also to a sample buffer 104 and an addition and subtraction unit 112. Herein, the pilot interference canceler includes the sample buffer 104, a controller 106, L fingers 108-1 to 108-L, and addition and subtraction units 110 and 112.

The sample buffer 104 consecutively stores the signal output from the RF front-end unit 102, and delivers the stored signal to the fingers 108-1 to 108-L. The total number L of fingers is determined depending on the maximum number of simultaneously accessible mobile stations supportable by the pilot interference canceler and the number of fingers allocated per mobile station. The fingers 108-1 to 108-L each estimate and regenerate a pilot signal corresponding to a multi-path channel of each mobile station. For the regeneration of the pilot signal, the fingers 108-1 to 108-L should receive a Pseudo Noise (PN) code of the mobile station to which they are allocated, and a finger offset caused by a channel delay, provided from the modem receiver 114. To this end, the controller 106 serves to deliver the PN code and finger offset information to the fingers 108-1 to 108-L.

The pilot signals regenerated in the fingers 108-1 to 108-L are added up by the addition and subtraction unit 110, and the resulting added signal is cancelled from the received signal. As a result, the pilot interference canceler generates a pilot signal-cancelled received signal.

FIG. 2 illustrates a detailed internal structure of the finger.

Referring to FIG. 2, a signal output from the sample buffer 104 is input to an interpolator 202. The interpolator 202 interpolates the received signal taking the finger offset into account, and converts the interpolated signal into a chip-based signal.

A PN generator 206 generates a local PN code synchronized to the corresponding finger taking into account a long code mask and a finger offset. The signal output from the interpolator 202 and the PN code output from the PN generator 206 undergo despreading through multiplication by a multiplier 204, and then output to a rake processor 208.

The rake processor 208 accumulates the input signal at intervals of N chips to increase a Signal-to-Noise Ratio (SNR). Herein, N is an implementation parameter, which is determined depending on a chip rate, the maximum change rate of the channel, etc. The rake processor 208 separately accumulates the signal to be used as an input to the channel predictor 214 and the signal to be used as an input to the frequency offset estimator 210.

The channel predictor 214 calculates a channel gain using the pilot symbol, which has been accumulated in units of N chips. The frequency offset estimator 210 estimates a frequency error using the pilot symbol, which has been accumulated without frequency offset compensation.

A pilot regenerator 212 regenerates a pilot signal using the output signal of the PN generator 206, the channel gain y(m) estimated by the channel predictor 214, and the frequency offset $\hat{\epsilon}$(m) estimated by the frequency offset estimator 210

A pilot SNR estimator 216 estimates an SNR of the pilot signal using the received signal from the sample buffer 104 and the channel gain y(m) from the channel predictor 214. A scaling factor determiner 218 calculates a scaling factor α(m) using the estimated SNR of the pilot signal. The scaling factor calculated in this way is multiplied by the signal output from the pilot regenerator 212, generating an output signal of a $k^{th}$ finger.

As described above, the pilot interference canceler regenerates and then adds up pilot signals of all mobile stations belonging to a particular cell or sector separately for each finger, and subtracts the result from the received signal. Performance of the pilot interference canceler is determined depending on how the estimation on the pilot signal included in the received signal is accurate. The pilot signal estimation accuracy of each finger is determined depending on the performance of the channel predictor, and the performance of the channel predictor is subject to change according to the SNR of the pilot signal. That is, when the SNR of the pilot signal is high, the accuracy of the channel predictor increases, decreasing the signal estimation error, and when the SNR of the pilot signal is low, the accuracy of the channel predictor decreases, increasing the signal estimation error.

The scaling factor calculated by the scaling factor determiner 218 of FIG. 2 serves to increase a cancellation rate of the pilot signal when the SNR of the pilot signal is high, and to decrease the cancellation rate of the pilot signal when the SNR of the pilot signal is low, thereby minimizing the amount of a residual interference signal included in the pilot signal-cancelled received signal. In order to calculate the scaling factor, there is a need for the noise power and pilot channel power estimated by the pilot SNR estimator. However, because the estimation on the pilot channel power is performed using the output signal of the channel predictor, an estimation error may occur during the scaling factor determination. In addition, when the estimation error of the channel predictor and the SNR of the finger have a nonlinear characteristic, the process of calculating a scaling factor from the estimated SNR is complicated, causing a dramatic increase in the implementation complexity.

SUMMARY OF THE INVENTION

To address the above-discussed deficiencies of the prior art, it is a primary aspect of the present invention to address at least the problems and/or disadvantages and to provide at least the advantages described below. Accordingly, an aspect of the present invention is to provide an apparatus and method for determining a scaling factor without SNR estimation for a pilot signal in a communication system.

According to one aspect of the present invention, there is provided a method for determining a scaling factor in a communication system. The method includes calculating an average power for each of an input signal and an output signal of a channel predictor; calculating a noise variance using the calculated average power; normalizing the noise variance with an average power of the channel predictor's output signal; and determining a scaling factor using the normalized noise variance.

According to another aspect of the present invention, there is provided an apparatus for determining a scaling factor in a communication system. The apparatus includes an average power calculator for calculating an average power for each of an input signal and an output signal of a channel predictor; a noise variance calculator for determining a normalized noise variance using the calculated average power; and a scale selector for determining a scaling factor using the normalized noise variance.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 3 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communication systems.

The present invention provides a method-for determining a scaling factor necessary for efficiently performing pilot interference cancellation in a communication system, and an apparatus thereof.

Figure 3:
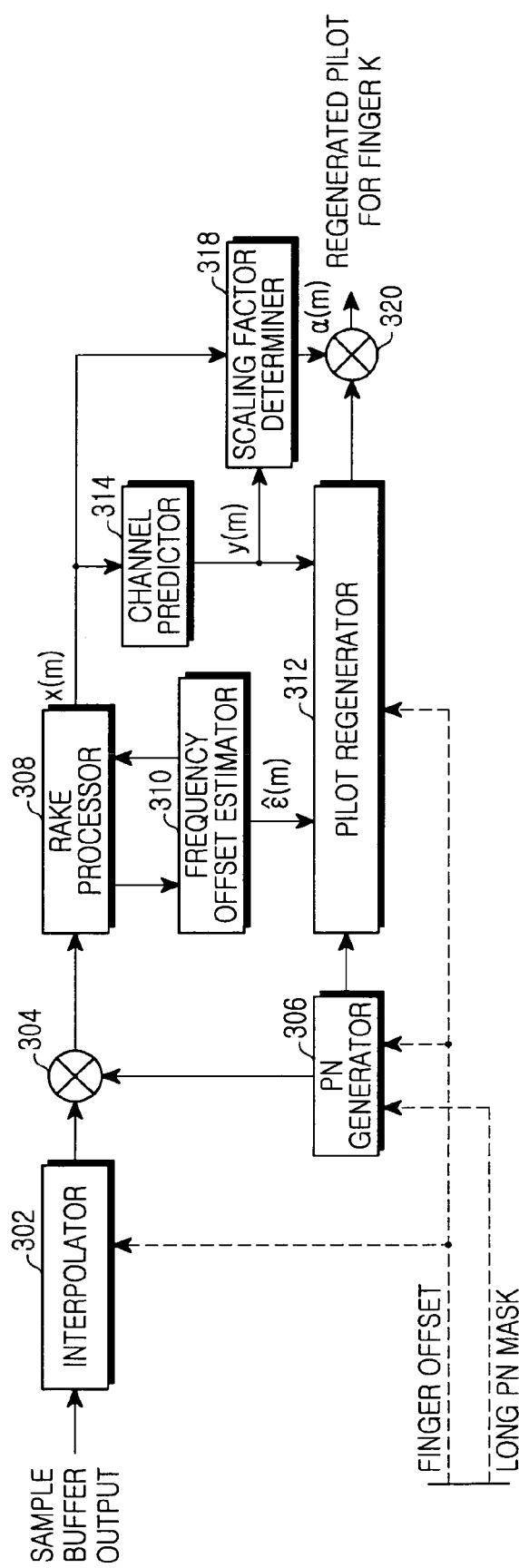
FIG. 3 is a diagram illustrating a detailed internal structure of a finger according to an embodiment of the present invention.

FIG. 3 illustrates a detailed internal structure of a finger according to an embodiment of the present invention.

Referring to FIG. 3, a signal output from a sample buffer is input to an interpolator 302. The interpolator 302 interpolates the received signal taking a finger offset into account, and converts the interpolated received signal in a chip-based signal.

A PN generator 306 generates a local PN code synchronized to the corresponding finger taking into account a long code mask and a finger offset, and the signal output from the interpolator 302 is multiplied by the generated PN code, thereby undergoing despreading (304), and then output to a rake processor 308.

The rake processor 308 accumulates the input signal at intervals of N chips to increase an SNR. Herein, N is an implementation parameter, which is determined depending on a chip rate, the maximum change rate of the channel, etc. The rake processor 308 separately accumulates the signal to be used as an input to a channel predictor 314, and the signal to be used as an input to a frequency offset estimator 310. The signal to be used as an input to the channel predictor 314 is determined by compensating and accumulating a frequency error using the output signal of the frequency offset estimator 310, and the signal to be used as an input to the frequency offset estimator 310 is determined by simply accumulating the input signal to the rake processor 308 without compensating the frequency error.

The channel predictor 314 calculates a channel gain value associated with the corresponding finger using the pilot symbol, which has been accumulated in units of N chips. The frequency offset estimator 310 estimates a frequency error using the pilot symbol, which has been accumulated without frequency offset compensation.

A pilot regenerator 312 regenerates a pilot signal using the output signal of the PN generator 306, the channel gain y(m) estimated by the channel predictor 314, and the frequency offset $\hat{\epsilon}(m)$ estimated by the frequency offset estimator 310.

Figure 1:
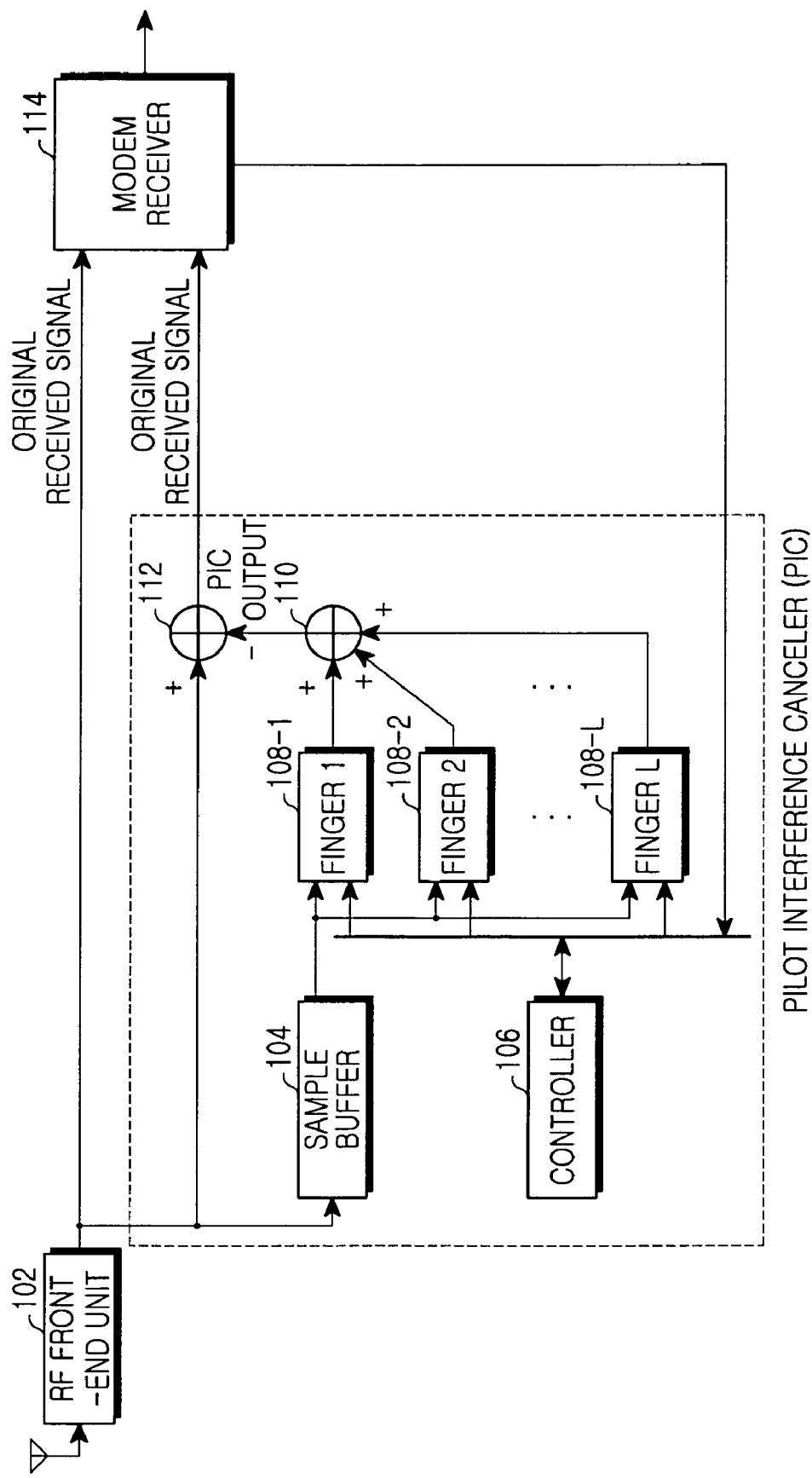
FIG. 1 is a diagram illustrating a structure of a receiver with a conventional pilot interference canceler.
Figure 2:
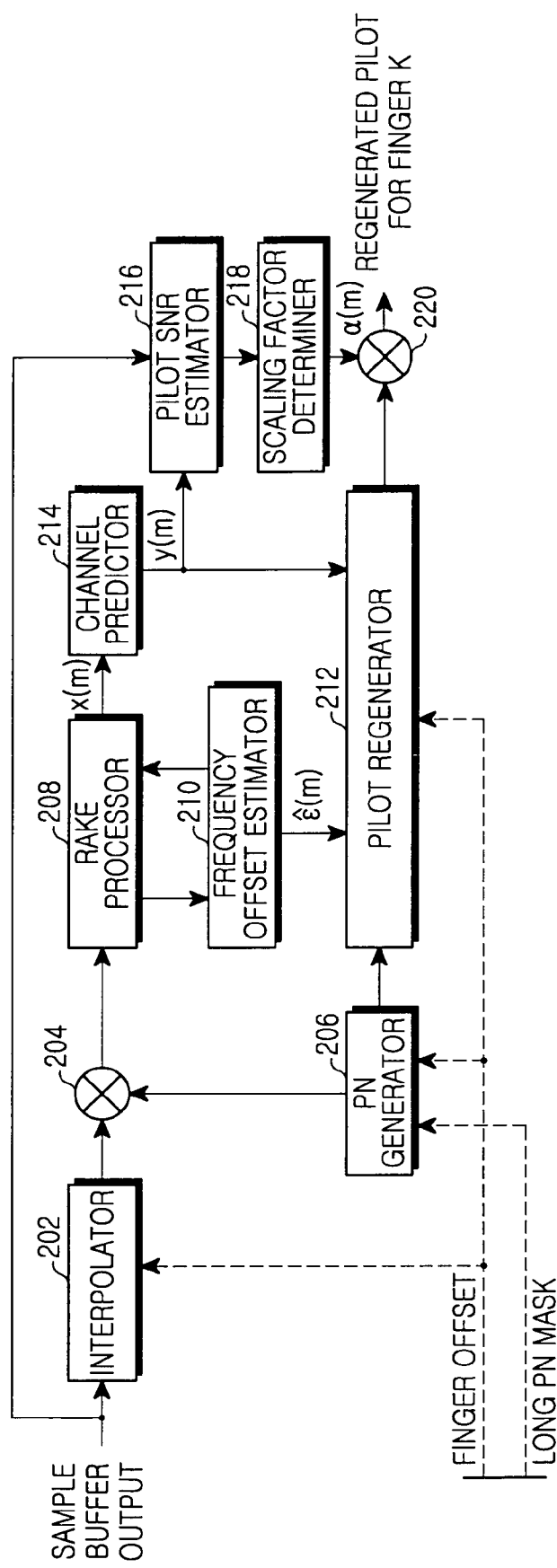
FIG. 2 is a diagram illustrating a detailed internal structure of the finger of FIG. 1.

Making a comparison between the finger's internal structure according to the present invention and the conventional finger's internal structure of FIG. 2, it can be noted that the finger according to the present invention does not include the pilot SNR estimator.

In the conventional finger, the pilot SNR estimator estimates the pilot SNR using the channel gain y(m). However, in the finger of the present invention, a scaling factor determiner 318, rather than estimating the pilot SNR, directly determines a scaling factor α(m) using an input signal x(m) and an output signal y(m) of the channel predictor 314. The scaling factor determined in this way is multiplied by the signal output from the pilot regenerator 312, generating an output signal of a $k^{th}$ finger.

Figure 4:
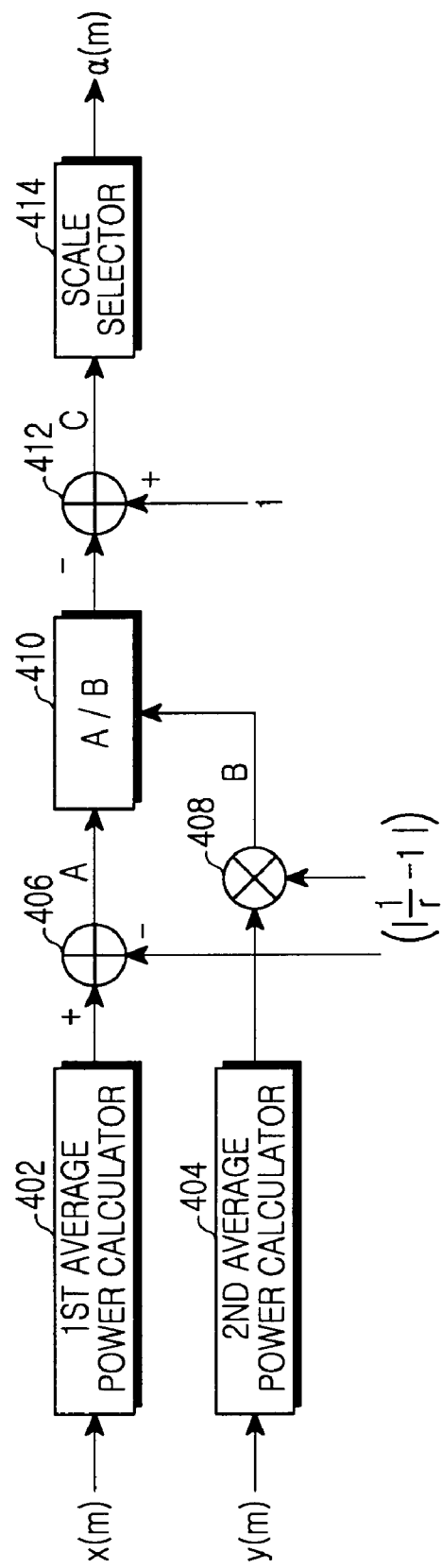
FIG. 4 is a diagram illustrating a detailed internal structure of a scaling factor determiner according to an embodiment of the present invention.

FIG. 4 illustrates a detailed internal structure of a scaling factor determiner 318 according to an embodiment of the present invention.

Referring to FIG. 4, if a finger's channel gain at time m is defined as h(m), an input signal x(m) to a channel predictor can be expressed as Equation 1:

$$x(m) = h(m) + u(m). \quad [\text{Eqn. 1}]$$

In Equation 1, u(m) denotes interference and noise included in the input signal to the channel predictor, and is generally regarded as Additive White Gaussian Noise (AWGN) whose power average is zero (0). Assuming that the channel predictor reduces a noise variance without affecting the h(m), an output signal y(m) of the channel predictor can be expressed as Equation 2:

$$y(m) = h(m) + w(m) \quad [\text{Eqn. 2}]$$

In Equation 2, w(m) denotes interference and noise included in the output signal of the channel predictor, and is generally regarded as AWGN with power average=0.

A first average power calculator 402 and a second average power calculator 404 calculate average powers for x(m) and y(m) shown in Equations 1 and 2, respectively, and the calculated average powers can be expressed as Equations 3 and 4, respectively. Alternatively, the first average power calculator 402 and the second average power calculator 404 can be realized with one average power calculator.

$$E[|x(m)|^2] = E[|h(m)|^2] + E[|u(m)|^2] \quad [\text{Eqn. 3}]$$

$$E[|y(m)|^2] = E[|h(m)|^2] + E[|w(m)|^2] \quad [\text{Eqn. 4}]$$

For calculation of the average powers shown in Equations 3 and 4, a Finite Impulse Response (FIR) filter and/or an Infinite Impulse Response (IIR) are used, and the structure of the filters can be determined depending on statistical characteristics of x(m) and y(m), and an update rate of the scaling factor.

From Equations 1 and 2, a ratio r in which the noise variance is reduced by the channel predictor can be expressed as Equation 5:

$$r = \frac{E[|w(m)^2|]}{E[|u(m)^2|]} \quad [\text{Eqn. 5}]$$

In Equation 5, r denotes a ratio of the noise variance included in the input signal to the channel predictor to the noise variance included the output signal of the channel predictor, and is defined as a constant according to the filter characteristic of the channel predictor.

The channel estimation performance of the channel predictor can be expressed as a Mean Square Error (MSE) defined as Equation 6:

$$MSE = \frac{E[|y(m) - h(m)|^2]}{E[|h(m)|^2]}. \quad [\text{Eqn. 6}]$$

In terms of Minimum Mean Square Error (MMSE), the optimal scaling factor α(m) can be expressed as Equation 7:

$$\alpha(m) = \frac{1}{1 + MSE} \quad [\text{Eqn. 7}]$$

Using all of the foregoing equations, the scaling factor α(m) can be rewritten as Equation 8:

$$\alpha(m) = 1 - \frac{E[|w(m)|^2]}{E[|y(m)|^2]} = 1 - \frac{E[|x(m)|^2] - E[|y(m)|^2]}{\left(\frac{1}{r} - 1\right) E[|y(m)|^2]} \quad [\text{Eqn. 8}]$$

That is, in FIG. 4, the average powers determined as Equations 3 and 4 are input to a noise variance calculator 410 by way of a addition and subtraction unit 406 and a multiplier 408, and an output of the noise variance calculator 410 undergoes addition and subtraction by means of an addition and subtraction unit 412, generating the resulting scaling factor defined in Equation 8. Herein, the output of the noise variance calculator 410 means a normalized noise variance. A further description thereof will be given with reference to FIG. 5. A scale selector 414 sets the scaling factor to '0' when the scaling factor calculated by Equation 8 is less than '0', and sets the scaling factor to '1' when the calculated scaling factor is greater than '1', so as to select the scaling factor such that it always has a value between 0 and 1. This can be expressed as Equation 9:

$$D = \min(C, 1)$$

$$\alpha(m) = \max(D, 0) \quad [\text{Eqn. 9}]$$

In Equation 9, C denotes a scaling factor calculated using Equation 8.

Figure 5:
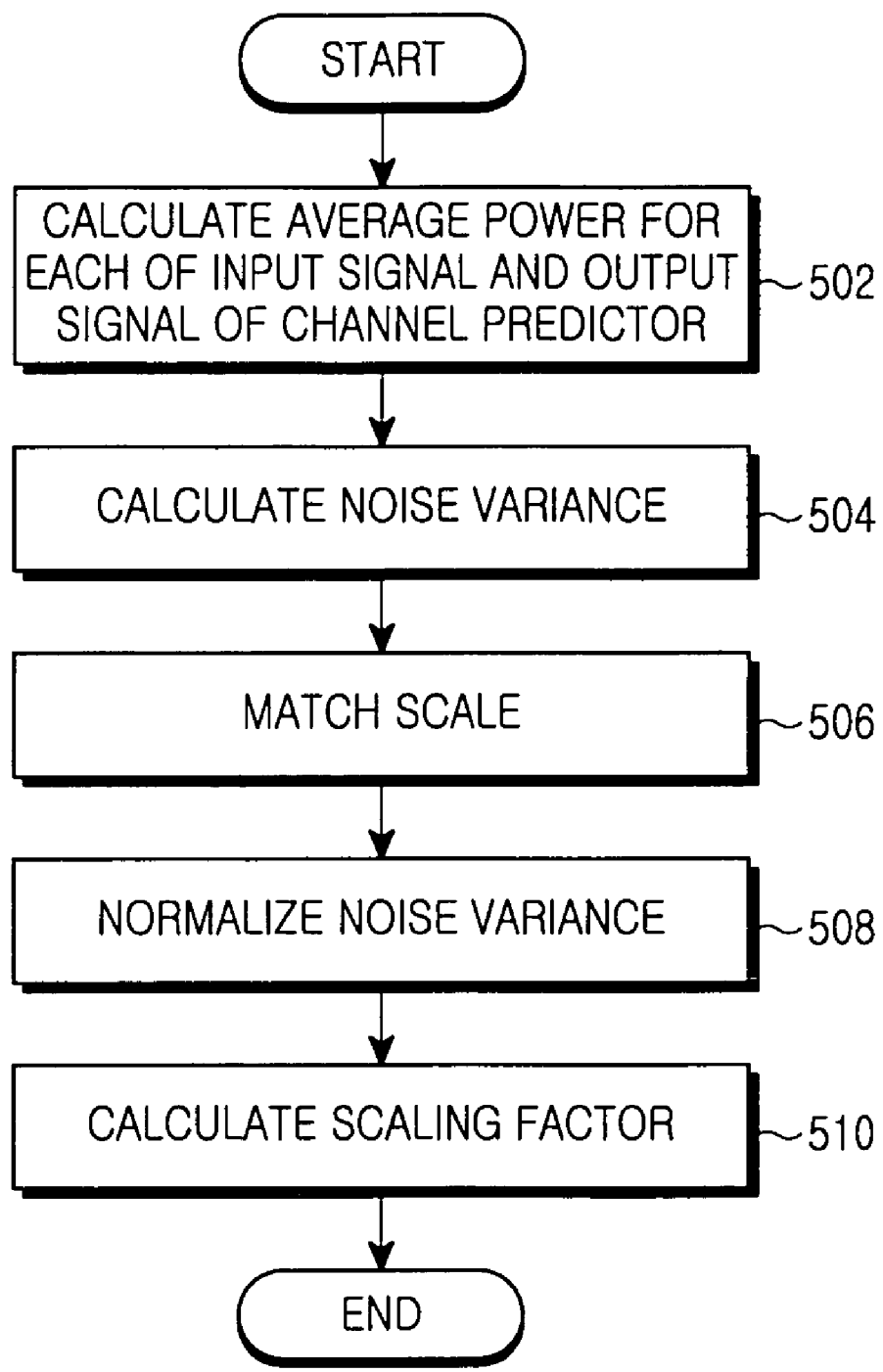
FIG. 5 is a flowchart illustrating a scaling factor determination process of a scaling factor determiner according to an embodiment of the present invention.

FIG. 5 illustrates a scaling factor determination process of a scaling factor determiner according to an embodiment of the present invention.

Referring to FIG. 5, in step 502, the scaling factor determiner calculates an average power for each of an input signal and an output signal of a channel predictor, and then proceeds to step 504. Herein, the input signal to the channel predictor means an output signal x(m) of a rake processor, and the output signal of the channel predictor means y(m). In step 504, the scaling factor determiner finds a noise variance by subtracting the average power of the x(m) from the average power of the y(m), and then proceeds to step 506.

In step 506, the scaling factor determiner scales an average power of the channel predictor's output signal y(m) to match in scale the noise variance to the average power of the channel predictor's output signal. In step 508, the scaling factor determiner normalizes the noise variance with the average power of the channel predictor's output signal. In step 510, the scaling factor determiner calculates a scaling factor using the normalized noise variance. A relationship between the normalized noise variance and the scaling factor can be expressed as Equation 10:

$$\alpha(m) = 1 - \frac{E\lfloor |w(m)^2|\rfloor}{E[|y(m)^2|]}. \quad \text{[Eqn. 10]}$$

In Equation 10, $$\frac{E\lfloor |w(m)^2|\rfloor}{E[|y(m)^2|]}$$

denotes the normalized noise variance.

Figure 6:
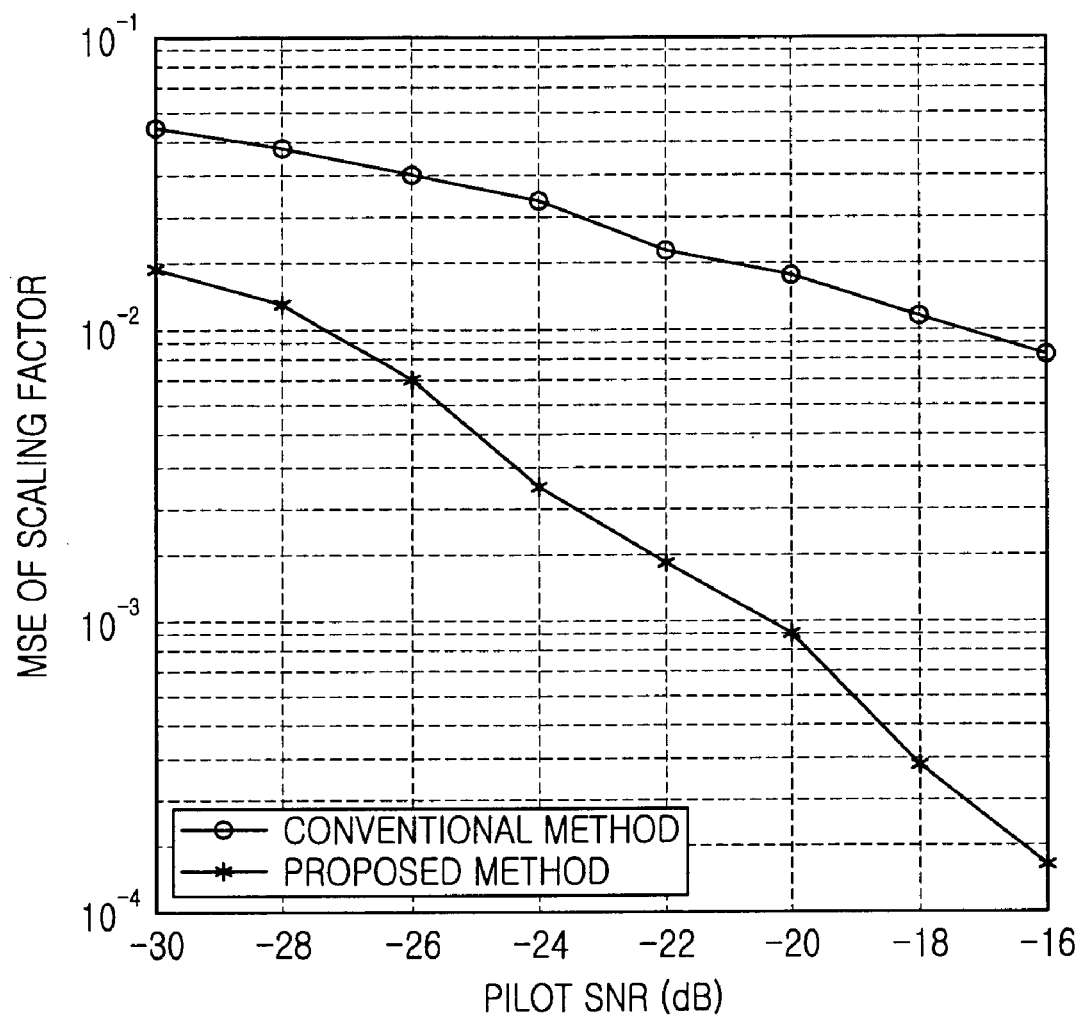
FIG. 6 is a graph illustrating an accuracy difference between the scaling factor found in the conventional method and the scaling factor found in the method according to an embodiment the present invention.

FIG. 6 illustrates an accuracy difference between the scaling factor found in the conventional method and the scaling factor found in the method according to an embodiment the present invention.

Referring to FIG. 6, the accuracy of the scaling factor was measured on the basis of Mean Square Error (MSE), and this can be defined as Equation 11:

$$MSE \text{ of Scaling Factor} = E\lfloor |\alpha(m) - \alpha_{opt}|^2 \rfloor \quad \text{[Eqn. 11]}$$

In Equation 11, $\alpha_{opt}$ denotes the optimal scaling factor determined using SNR of a given pilot signal.

In the simulation environment, for the Code Division Multiple Access (CDMA) 2000 1xEV-DO reverse link, a carrier frequency is 2.0 GHz, a moving velocity of the mobile station is 3 Km/h, and the channel predictor uses a 16-tap FIR filter, and uses a 1-tap IIR filter for average power calculation. It is shown in FIG. 6 that the scaling factor determination method proposed by the present invention is superior to the conventional method in terms of MSE performance.

As is apparent from the foregoing description, the present invention implements the finger with a pilot SNR estimator removed, thereby contributing to minimization of the hardware implementation cost.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for determining a scaling factor by a receiver in a communication system, the method comprising:
   calculating an average power for each of an input signal and an output signal of a channel predictor;
   calculating a noise variance using the calculated average power;
   normalizing the noise variance with an average power of the output signal of the channel predictor; and
   determining a scaling factor using the normalized noise variance.

2. The method of claim 1, wherein the scaling factor α(m) determined using the normalized noise variance is calculated using the following equation;

$$\alpha(m) = 1 - \frac{E\lfloor |w(m)^2|\rfloor}{E[|y(m)^2|]}$$

wherein $$\frac{E\lfloor |w(m)^2|\rfloor}{E[|y(m)^2|]}$$

denotes the normalized noise variance, $E\lfloor |w(m)^2| \rfloor$ denotes an average power of an interference component included in the output signal of the channel predictor, and $E\lfloor |y(m)^2| \rfloor$ denotes the average power of the output signal of the channel predictor.

3. The method of claim 1, further comprising:
   matching the average power of the output signal of the channel predictor to the noise variance in terms of a scale.

4. An apparatus for determining a scaling factor in a communication system, the apparatus comprising:
   an average power calculator configured to calculate an average power for each of an input signal and an output signal of a channel predictor;
   a noise variance calculator configured to determine a normalized noise variance using the calculated average power; and
   a scale selector configured to determine a scaling factor using the normalized noise variance.

5. The apparatus of claim 4, wherein the scaling factor α(m) determined using the normalized noise variance is calculated using the following equation;

$$\alpha(m) = 1 - \frac{E\lfloor |w(m)^2|\rfloor}{E[|y(m)^2|]}$$

wherein $$\frac{E\lfloor |w(m)^2|\rfloor}{E[|y(m)^2|]}$$

denotes the normalized noise variance, $E\lfloor |w(m)^2| \rfloor$ denotes an average power of an interference component included in the output signal of the channel predictor, and $E\lfloor |y(m)^2| \rfloor$ denotes an average power of the output signal of the channel predictor.

6. The apparatus of claim 4, wherein the average power calculator calculates an average power using at least one of a Finite Impulse Response (FIR) filter and an Infinite Impulse Response (IIR) filter.

7. The apparatus of claim 4, wherein the scale selector determines a scaling factor having a value between 0 and 1.

8. A base station capable of communicating with a plurality of mobile stations of a wireless network, wherein the base station comprises:
   an apparatus configured to determine a scaling factor in a communication system, the apparatus comprising:
   an average power calculator configured to calculate an average power for each of an input signal and an output signal of a channel predictor;

a noise variance calculator configured to determine a normalized noise variance using the calculated average power; and a scale selector configured to determine a scaling factor using the normalized noise variance.

9. The base station of claim 8, wherein the scaling factor α(m) determined using the normalized noise variance is calculated using the following equation;

$$\alpha(m) = 1 - \frac{E\lfloor |w(m)^2|\rfloor}{E[|y(m)^2|]}$$

wherein $$\frac{E\lfloor |w(m)^2|\rfloor}{E[|y(m)^2|]}$$

denotes the normalized noise variance, $E\lfloor |w(m)^2|\rfloor$ denotes an average power of an interference component included in the output signal of the channel predictor, and $E\lfloor |y(m)^2|\rfloor$ denotes an average power of the output signal of the channel predictor.

10. The base station of claim 8, wherein the average power calculator calculates an average power using at least one of a Finite Impulse Response (FIR) filter and an Infinite Impulse Response (IIR) filter.

11. The base station of claim 8, wherein the scale selector determines a scaling factor having a value between 0 and 1.

12. The base station of claim 8, further comprising one or more processors collectively implementing a method for determining the scaling factor in a communication system, the method comprising:

calculating the average power for each of an input signal and an output signal of the channel predictor;

calculating the noise variance using the calculated average power;

normalizing the noise variance with an average power of the output signal of the channel predictor; and determining the scaling factor using the normalized noise variance.

13. The base station of claim 12, wherein the scaling factor α(m) determined using the normalized noise variance is calculated using the following equation;

$$\alpha(m) = 1 - \frac{E\lfloor |w(m)^2|\rfloor}{E[|y(m)^2|]}$$

wherein $$\frac{E\lfloor |w(m)^2|\rfloor}{E[|y(m)^2|]}$$

denotes the normalized noise variance, $E\lfloor |w(m)^2|\rfloor$ denotes an average power of an interference component included in the output signal of the channel predictor, and $E\lfloor |y(m)^2|\rfloor$ denotes the average power of the output signal of the channel predictor.

14. The base station of claim 12, wherein the method further comprises:

matching the average power of the output signal of the channel predictor to the noise variance in terms of a scale.

15. The method of claim 1, wherein the average power is calculated using at least one of a Finite Impulse Response (FIR) filter and an Infinite Impulse Response (UR) filter.

16. The method of claim 1, wherein the scaling factor has a value between 0 and 1.

17. The apparatus of claim 4, further comprising a scaling factor determiner configured to match the average power of the output signal to the noise variance in terms of a scale.

18. The apparatus of claim 4, wherein the calculated average power is input to the noise variance calculator by way of an addition and subtraction unit and a multiplier.

19. The base station of claim 8, wherein the calculated average power is input to the noise variance calculator by way of an addition and subtraction unit and a multiplier.

20. The base station of claim 8, further comprising a scaling factor determiner configured to match the average power of the output signal to the noise variance in terms of a scale.

* * * * *